United States Patent [19]

Cosgrove et al.

[11] Patent Number: 4,731,831
[45] Date of Patent: Mar. 15, 1988

[54] TELEPHONE INSTRUMENT

[75] Inventors: Ian T. Cosgrove, Chilwell; Derrick Bent, Beeston, both of England

[73] Assignee: Plessey Overseas Limited, Ilford, England

[21] Appl. No.: 909,396

[22] Filed: Sep. 19, 1986

[30] Foreign Application Priority Data

Sep. 19, 1985 [GB] United Kingdom ................. 8523181

[51] Int. Cl.$^4$ ...................... H04M 1/60; H04M 19/00
[52] U.S. Cl. ...................................... 379/388; 323/224
[58] Field of Search ................ 379/388, 413; 323/223, 323/224, 225, 226

[56] References Cited

U.S. PATENT DOCUMENTS 4,644,579 2/1987 Whittaker ........................... 379/388

Primary Examiner—Stafford D. Schreyer
Attorney, Agent, or Firm—Michael F. Oglo; Julian C. Renfro

[57] ABSTRACT

Featurephone III Provides a line powered loud speaking telephone which meets BSI standards for current drain.

To maintain the instrument at a fixed position on a V/I curve a constant current drain is provided across the line form which the instrument amplifier is fed. Accordingly, regardless of amplifier power requirement variations, current drain from the line is constant.

3 Claims, 2 Drawing Figures

TELEPHONE INSTRUMENT

The present invention relates to telephone instruments and more particularly but not exclusively to telephone instruments including amplification circuitry for providing hands-free operation for example.

Telephone instruments including loudspeakers and external microphones to provide hands-free usage are well known. However, such instruments are usually powered from an independent source (for example by batteries or mains electrical power), to provide sufficient power for speaker and amplification circuits.

Some telecommunications administrations apply strict regulations relating to permissible current drain from the line and consistency of the current/voltage relationship of the connected instrument to the line.

Many loudspeaking telephone instruments which are powered solely from the line do not meet the aforementioned regulations.

It is an object of the present invention to provide a telephone instrument adapted to be powered from a telephone line and capable of meeting the requirements of the regulations outlined above.

According to the present invention there is provided a telephone instrument comprising a constant current source arranged for connection across a line to a telephone exchange, the constant current source comprising a regulated voltage output, means to sense variation in current demand from said regulated voltage output and means to cause an increase or decrease in dissipation of power within the source circuit in dependence upon the sensed variation whereby variation in current demanded by one or more auxiliary circuits connected to the regulated voltage output is not reflected in the current demand from the connected line.

Preferably means to cause an increase or decrease in dissipation of power comprises a transistor responsive to a decrease in current demand to increase current flow through a resistive dissipator.

The telephone instrument may include amplifier means powered from said regulated voltage output, said amplifier means supplying a loudspeaker.

A telephone instrument in accordance with the invention will now be described by way of example only with reference to the accompanying drawings of which:

Figure 1:
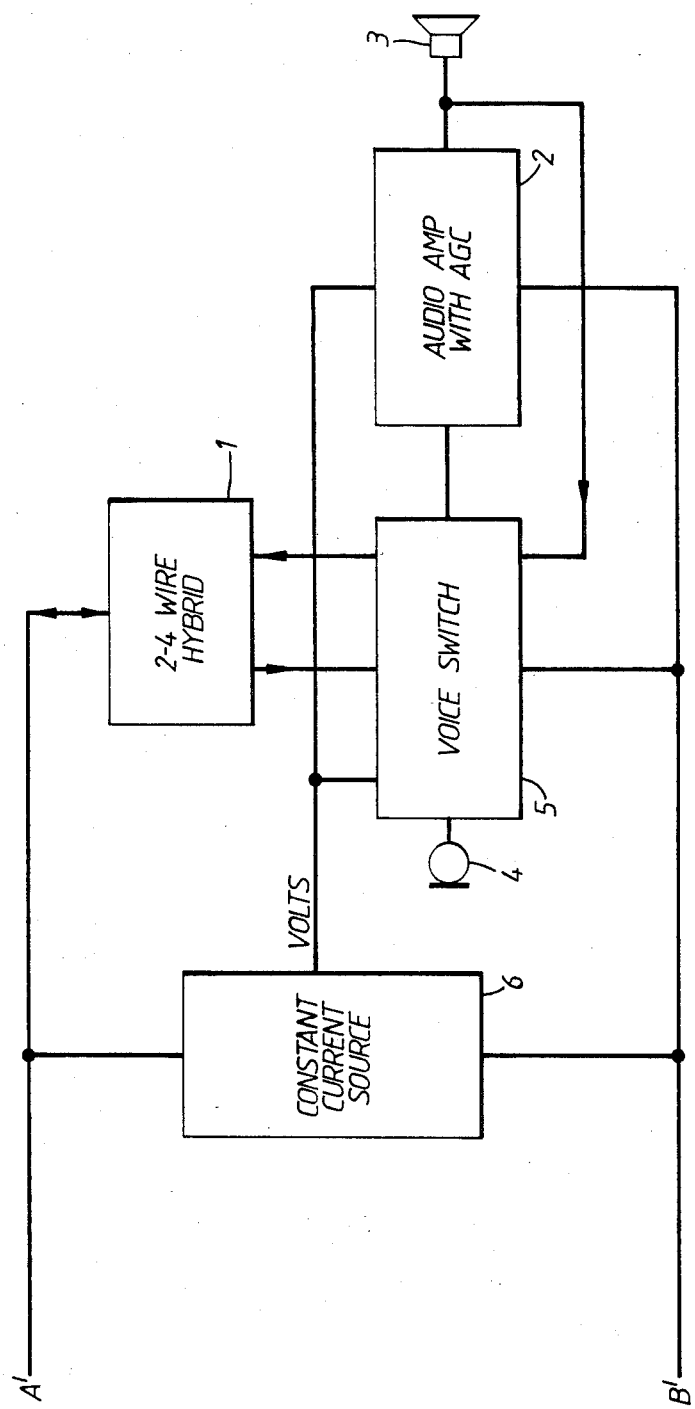
FIG. 1 is a block schematic diagram of the instrument.

Referring to FIG. 1 the instrument is arranged for connection to a line A' B' to a telephone exchange (not shown) and comprises a two-wire to four-wire hybrid transformer 1, amplification circuits 2 and speaker 3 for incoming speech signals and a microphone 4 for outgoing speech signals together with voice switching circuitry 5 to prevent feedback between the speaker 3 and the microphone 4.

As thus far described the telephone instrument is similar to, and functions in the same manner as, many loudspeaking ("hands-free") telephone instruments available commercially. However, as has been noted, many of the available line-powered instruments fail to meet the standards required in the maintenance of the position of the instrument on the line A B voltage/current curve. For example, the power requirement for the amplifier 2 will vary with the strength of the incoming signal particularly when AGC (Automatic Gain Control) is employed. Similarly, an interruption by a user may cause the voice switch 5 to cut off the amplifier 2 and switch in the microphone 4 causing a change in the power demand.

In the present telephone instrument the variations are overcome by using a power supply 6 which acts as a constant current source across the line A' B' by dissipating more power within itself when current demand in the connected circuitry decreases and dissipating less power within itself when that current demand increases.

Figure 2:
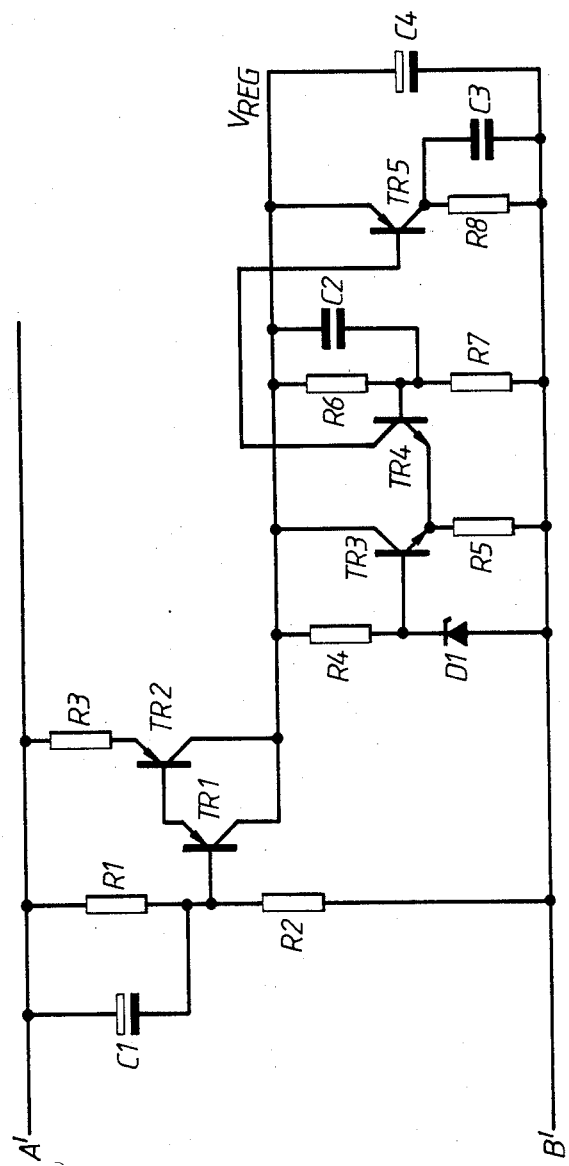
FIG. 2 shows a circuit of the constant current source of the instrument of FIG. 1.

The power supply 6 is shown in greater detail in FIG. 2 to which reference will now be made.

The current source of the power supply comprises a capacitor C1, resistor chain R1, R2, and transistors TR1 and TR2 biassed by a resistor R3 to provide a regulated voltage output V reg in known manner.

The configuration also has a power sink circuit and constant voltage regulation which comprises three transistors TR3, TR4 and TR5 and resistors R4–R8.

Now, for example, as the current demand at the output V reg drops, the transistor TR2 begins to saturate. This results in the constant voltage regulator (comprising transistors TR3 and TR4, resistors R4–R8 and diode D1) causing the transistor TR5 to turn on.

TR5 turning on causes current to be drawn from the output V reg line through the resistor R8 sinking the excess current.

When the load current demand increases the constant voltage regulation causes the transistor TR4 to start turning off resulting in a reduction in the power dissipated in the resistor R8 and maintaining a steady current demand through the line A' B'.

Whilst as herein described the power supply 6 supplies certain components of a loudspeaking telephone (other components of the instrument being those of a conventional telephone instrument), it will be appreciated that any auxiliary circuit having varying current demand may be supplied by the output V reg.

We claim:

1. A telephone instrument comprising a constant current source arranged for connection across a line to a telephone exchange, the constant current source comprising a regulated voltage output, means to sense variation in current demand from said regulated voltage output and means to cause an increase or decrease in dissipation of power within the source circuit in dependence upon the sensed variation whereby variation in current demanded by one or more auxiliary circuits connected to the regulated voltage output is not reflected in the current demand from the connected line.

2. A telephone instrument as claimed in claim 1 in wich the means to cause an increase or decrease in dissipation of power comprises a transistor responsive to a decrease in current demand to increase current flow through a resistive dissipator.

3. A telephone instrument as claimed in claim 1 including amplifier means powered from said regulated voltage output, said amplifier means supplying a loudspeaker.

* * * * *